(12) United States Patent
Chang et al.

(10) Patent No.: US 6,512,734 B1
(45) Date of Patent: Jan. 28, 2003

(54) ADJUSTING MECHANISM OF THE GUIDE ROD OF OPTICAL PICK-UP IN AN OPTICAL DISK DRIVE

(76) Inventors: Ching-Wei Chang, No. 656, Chung Hsing Rd., San Ho, Nantou (TW); Ching-Hsiang Tsai, 4F, No. 7, Alley 249, Fu Yuan St., Taipei (TW)

( * ) Notice: Subject to any disclaimer, the term of this patent is extended or adjusted under 35 U.S.C. 154(b) by 0 days.

(21) Appl. No.: 09/501,608

(22) Filed: Feb. 10, 2000

(30) Foreign Application Priority Data

Jul. 1, 1999 (TW) .................................. 88210925 U

(51) Int. Cl.[7] ............................................... G11B 17/03
(52) U.S. Cl. ...................................................... 369/219
(58) Field of Search .............................. 369/219, 220, 369/223, 215, 249

(56) References Cited

U.S. PATENT DOCUMENTS 5,933,407 A * 8/1999 Watanabe et al. ........... 369/219
5,995,478 A * 11/1999 Park ............................ 369/219
6,044,057 A * 3/2000 Park et al. ................... 369/219
6,188,665 B1 * 2/2001 Furusawa .................... 369/219
6,192,023 B1 * 2/2001 Seo ............................. 369/219

* cited by examiner

Primary Examiner—Allen Cao
(74) Attorney, Agent, or Firm—Troxell Law Office PLLC

(57) ABSTRACT

An adjusting mechanism of the guide rod of the optical pick-up in an optical disk drive, including an optical disk drive chassis, an elastic fixture of the optical pick-up module, a substrate of the optical pick-up module, the guide rods of the optical pick-up, and adjusting screws, wherein the substrate of the optical pick-up module is fixed on the optical disk drive chassis by the elastic fixture of the optical pick-up module, and the vibration can be released by virtue of the elasticity, and to provide the fixture of the guide rod of the optical pick-up. Therefore, the incident angle of the laser beam can be adjusted by adjusting the screws to eliminate deviation of the incident angle due to the error of manufacture, then the number of part can be reduce, and the assembly process can be simplified, so the added value can be promoted.

9 Claims, 10 Drawing Sheets

ADJUSTING MECHANISM OF THE GUIDE ROD OF OPTICAL PICK-UP IN AN OPTICAL DISK DRIVE

BACKGROUND OF THE INVENTION

1. Field of the Invention

This invention relates generally to an adjusting mechanism of a guide rod of optical pick-up in an optical disk drive, and more particularly to an adjusting mechanism of the guide rod of the optical pick-up which is constructed by a chassis, an elastic fixture of the optical pick-up module, a substrate of the optical pick-up module, a guide rod of the optical pick-up and an adjusting screw, thereby the error of manufacture which may result into the deviation of the incident laser beam can be compensated, the number of parts can be reduced, and the assembly process can be simplified, therefore, the added value of the product can be improved.

2. Brief Description of the Prior Art

The optical pick-up module in an optical disk drive includes a motor which is driven to rotate a disk and a optical pick-up which can move in linear motion, while during reading recorded data and writing data onto a disk, a great degree of vibration will be induced along with this process. To increase the performance of data reading and writing, the plane composed by two guide rods of optical pick-up and the turn table of the motor should be as parallel as possible, and the altitude difference of each other should be controlled under a determined range. To compensate the manufacture error, there should be an adjusting mechanism to adjust the degree of parallel and altitude difference between the plane composed by the two guide rods and the turn table of the motor, and this function is more important in the high speed and high data density optical disk drive.

In the prior art of an optical disk drive, the optical pick-up and motor are assembled on a substrate of an optical pick-up module, and the substrate of the optical pick-up module is suspended on the chassis by a plurality of damping rubbers. By virtue of the damping of these damping rubbers, the vibration of the optical pick-up module can be released and more components are necessary. The guide rods are locked firmly on the substrate of the optical pick-up module. As the position of the guide rods can not be adjusted, so it is not able to overcome the errors that resulted in during manufacturing and assembling.

SUMMARY OF THE INVENTION

The object of this invention is to provide a new mechanism to integrate inthe adjustment of the incident angle of the laser beam respect to the optical disk and the suspension of the optical pick-up module substrate together. Therefore, the components can be reduced and the assembly process can be simplified, thereof the added value of products can be promoted.

The another object of this invention is to provide an adjusting mechanism of the guide rod of the optical pick-up, wherein the substrate of the optical pick-up module is assembled with the chassis of optical disk drive by a position pin, a screw and an elastic fixture, such that the assembly process is simplified.

The third object of this invention is to provide an adjusting mechanism of the guide rod of the optical pick-up, wherein there is a fixture of the guide rod on the substrate of the optical pick-up module. In addition, the bottom portion of the fixture disposes a screw hole to fit the adjusting screw for adjustment. Its construction is then simplified.

The fourth object of this invention is to provide an adjusting mechanism of the guide rod of the optical pick-up, wherein said elastic fixture has two spring plates each is fixed at one end and the other end can be pressed elastically down to the guide rod of the optical pick-up module.

The fifth object of this invention is to provide an adjusting mechanism of the guide rod of the optical pick-up, wherein the elastic feature of the elastic fixture can reduce and isolate the vibration of the optical pick-up module during reading and writing data, and it can be used as a support for the rotation of the optical pick-up module, the construction of present invention is then simplified.

The another object of this invention is to provide an adjusting mechanism of the guide rod of the optical pick-up, wherein the adjustment of the incident angle of the laser beam respect to the disk can be achieved by adjusting the adjusting screw. The assembly is then simplified.

A more complete understanding of these and other features and advantages of the present invention will become apparent from a careful detailed description of certain embodiments illustrated in the accompanying drawings.

DETAILED DESCRIPTION OF THE PREFERRED EMBODIMENT

Figure 1:
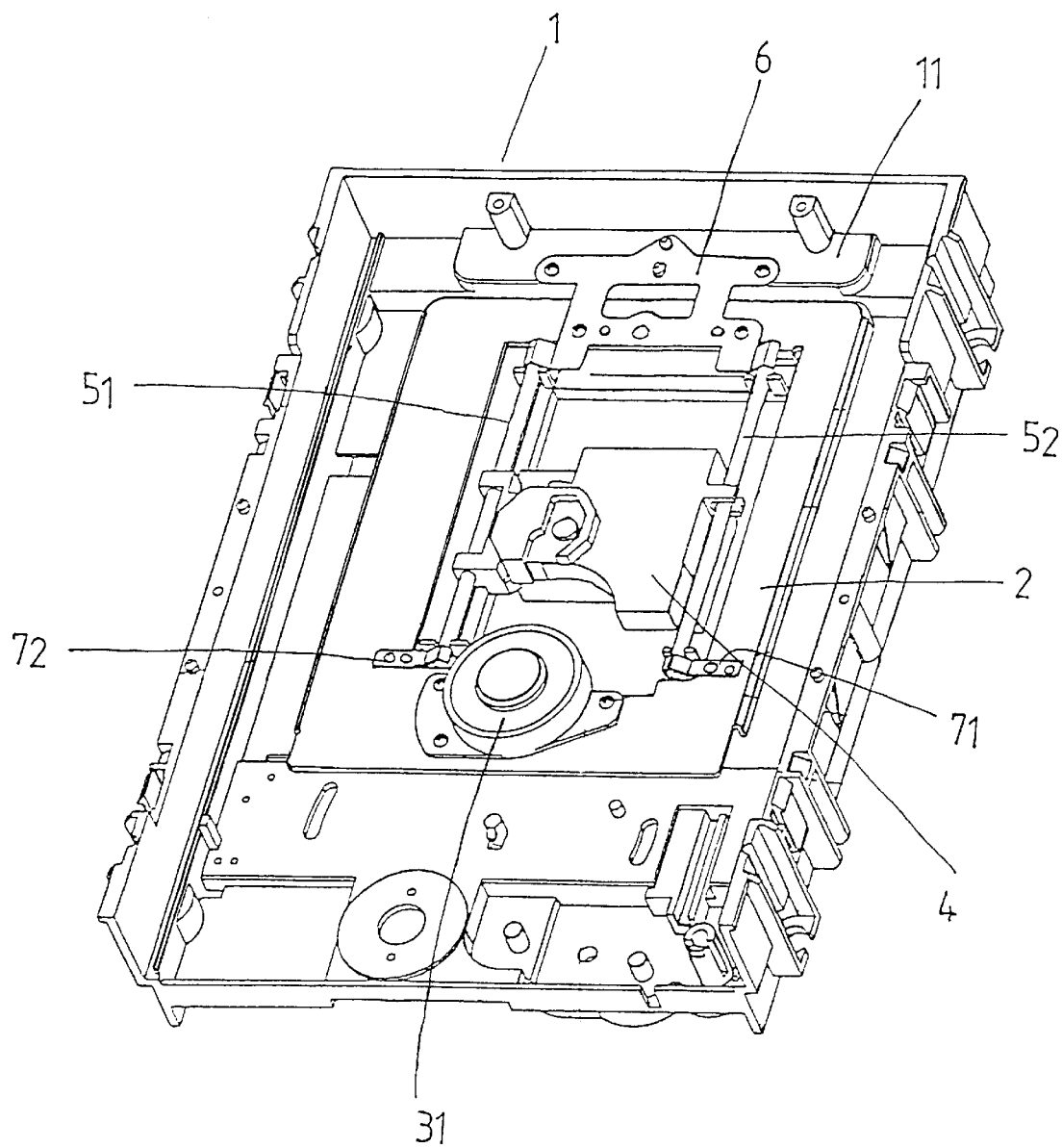
FIG. 1 is the perspective view of the optical disk drive of this invention.

The adjusting mechanism of the guide rod of the optical pick-up according to this invention is shown as FIG. 1, including a chassis 1, a substrate of the optical pick-up module 2, motor 31, an optical pick-up 4, the guide rods for supporting the optical pick-up 51, 52, the fixture of the optical pick-up module 6, and the fixing press of the guide rod of the optical pick-up 71, 72.

Figure 2:
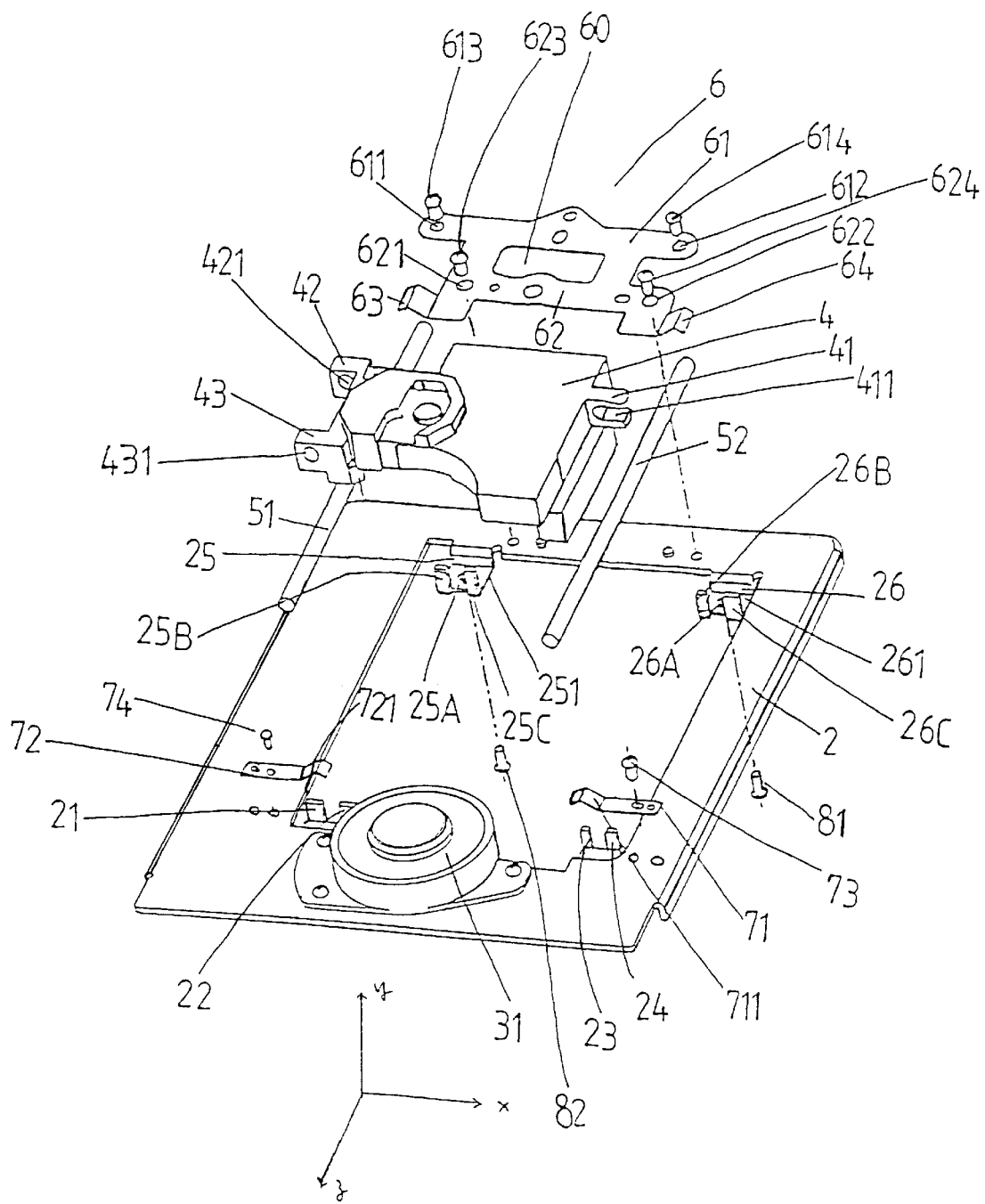
FIG. 2 is a perspective explosive view showing the construction of the optical pick-up module of this invention.
Figure 3:
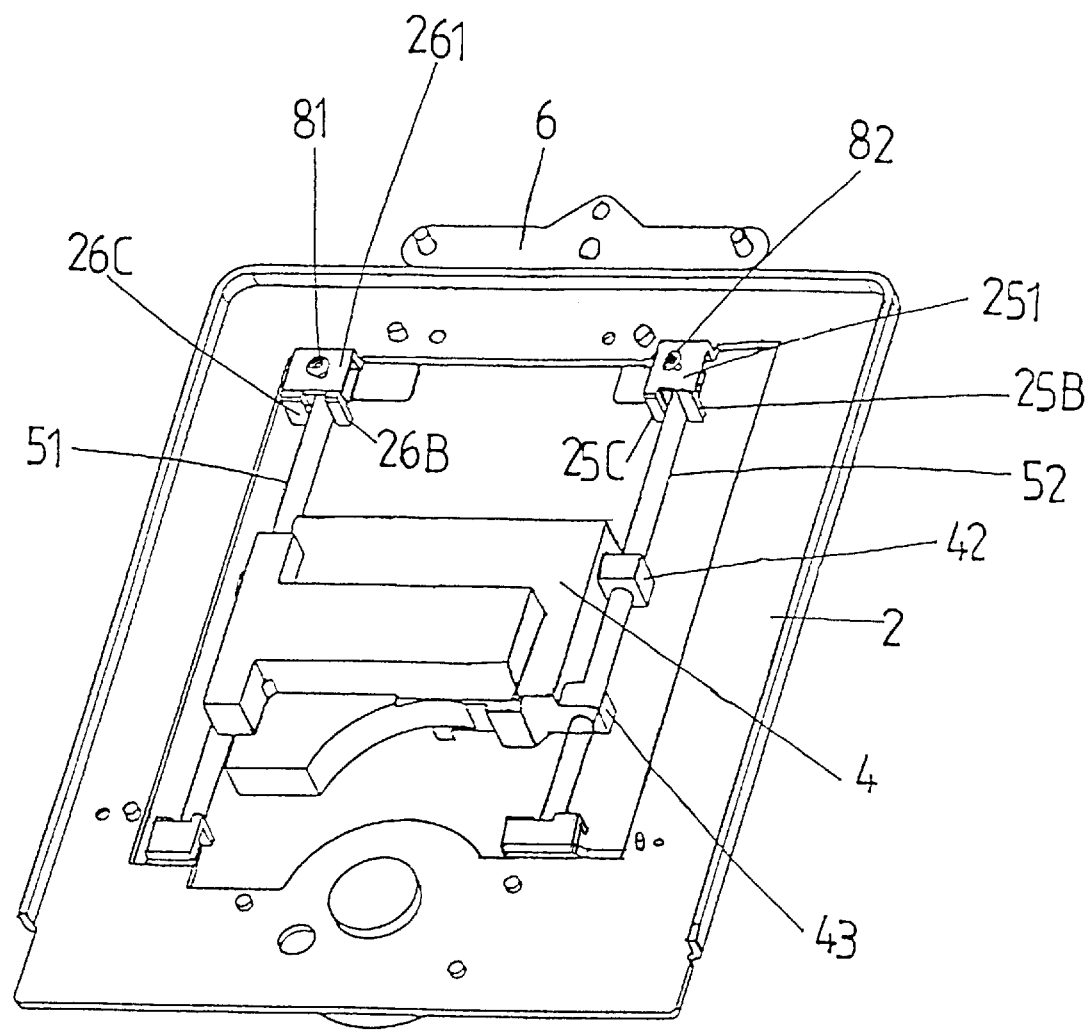
FIG. 3 is a perspective view showing the rear side of the optical pick-up module according to this invention.

Refer to FIG. 2, as the figure illustrates, one end of the substrate of the optical pick-up module 2 is provided to fix the motor 31, which on each of the two sides of the center disposed two support plate 21, 22, 23, 24, on the another end corresponding to the support plate 21, 22, 23, 24 disposed fixtures of the guide rod 25, 26; fixtures of the guide rod 25, 26 is formed by precisely press forming on the substrate of the optical pickup module 2, and one end of that is connected with the substrate 2. The fixtures of the guide rod disposed plates 251, 261, and on the center of the plates 251, 261, two screw holes 25A, 26A are formed for the adjusting screws 81, 82 to penetrate from bottom to top(refer to FIG. 3); and at the other end of the plates 251, 261, the support plates are also provided; accordingly, guide rods 51, 52 can span between the support plates 21, 22, 23, 24 and the support plates 25B, 25C, 26B, 26C.

In addition, an optical pick-up 4 which is supported by the guide rods 51, 52, are formed by open-mode suspender 41 and two bearings 42, 43. There is an opening 411 in the center of the open-mode suspender, and there are pinholes 421, 431 in the center of the bearing to fit one side of the guide rod 51. Therefore, the optical pick-up 4 can be supported by fitting the guide rods 51, 52 into the open-mode suspender 41 and bearing 42, 43.

The fixing press of the guide rod of the optical pick-up 71, 72 can be fixed by screws 73, 74 on the substrate 2, and there are pressing plates 711, 721 on the other end of the fixing press of the guide rod of the optical pick-up 71, 72. The pressing plates 711, 721 are in the form of cantilevers which are fixed at the one end and the other end can be freely moved, and the cantilevers are bent to form a elbow. Therefore, one end of the guide rods 51, 52 can be pressed down by the elbow of the cantilevers.

Moreover, the fixture of the optical pick-up module 6, basically in the form of I plate, can be regarded as a rear end plate 61 and a front end plate 62. There is a hole 60 at the connection of the rear end plate 61 and the front end plate 62 to provide necessary elasticity. The rear end plate 61 is fixed onto the platform 11 of the chassis 1 by screws 613, 614 via a fixing hole at the both sides, and thereof to support the optical pick-up module, moreover, the vibration can be released by the elasticity of the fixture.

While implement, guide rods 51, 52 respectively penetrate the openmode suspender 41 and bearing 42, 43 on the both side of the optical pickup 4 to support optical pick-up 4 and the two ends spans between the support plates 21, 22, 23, 24 and support plates 25B, 25C, 26B, 26C, which are pressed by the elastic pressing plates 63, 64 on the upper and the elbow of the pressing plates 711, 721. When adjusting the altitude, the guide rods 51, 52 which are fixed by the support plates 21, 22, 23, 24 and 25B, 25C, 26B, 26C can be stablly moved by vertically adjusting the screw 81, 82 in the y direction and after moving to the right position, the screw can be fixed by disperse some glue.

Figure 4:
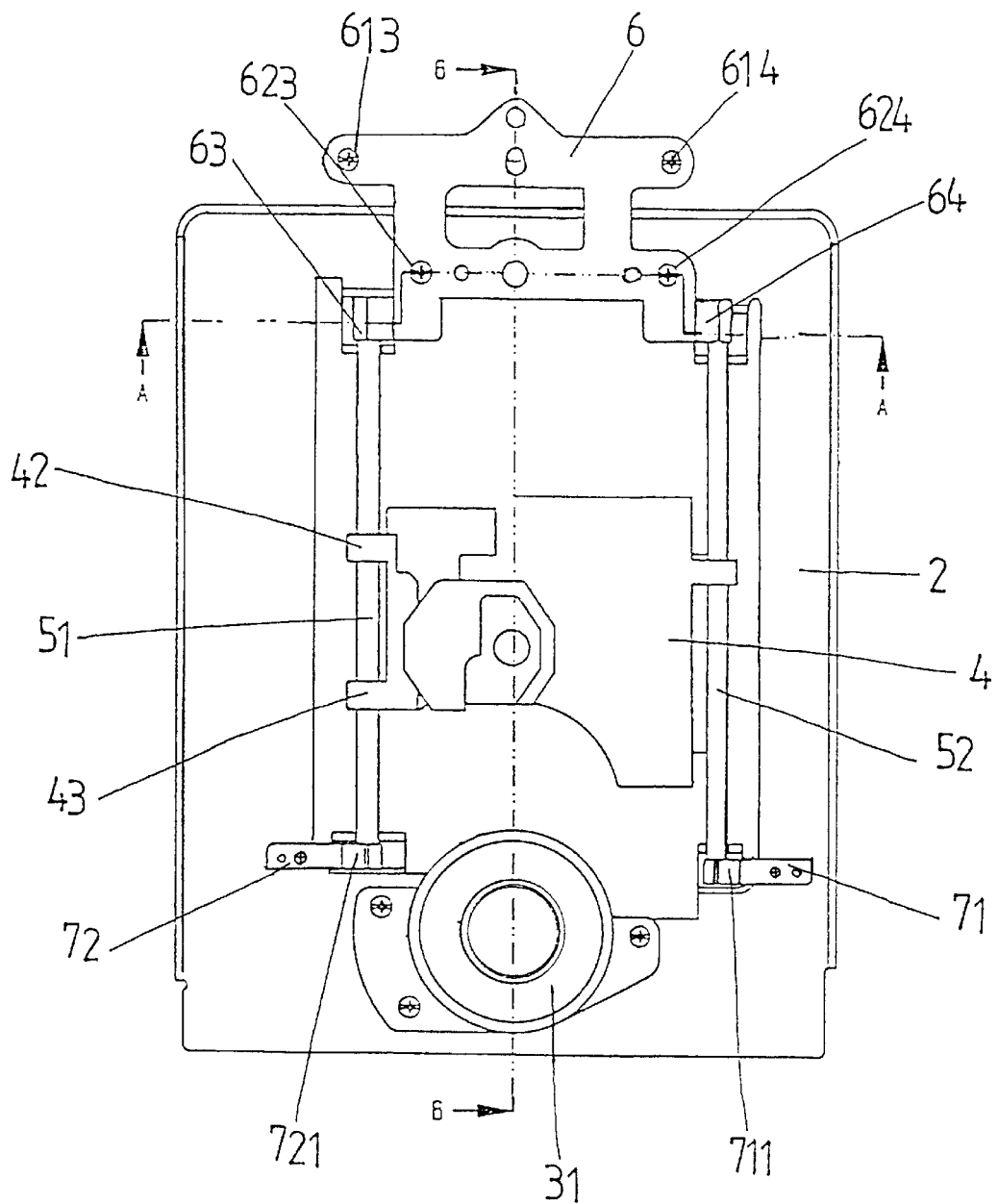
FIG. 4 is the illustrative plain view of FIG. 2.
Figure 5:
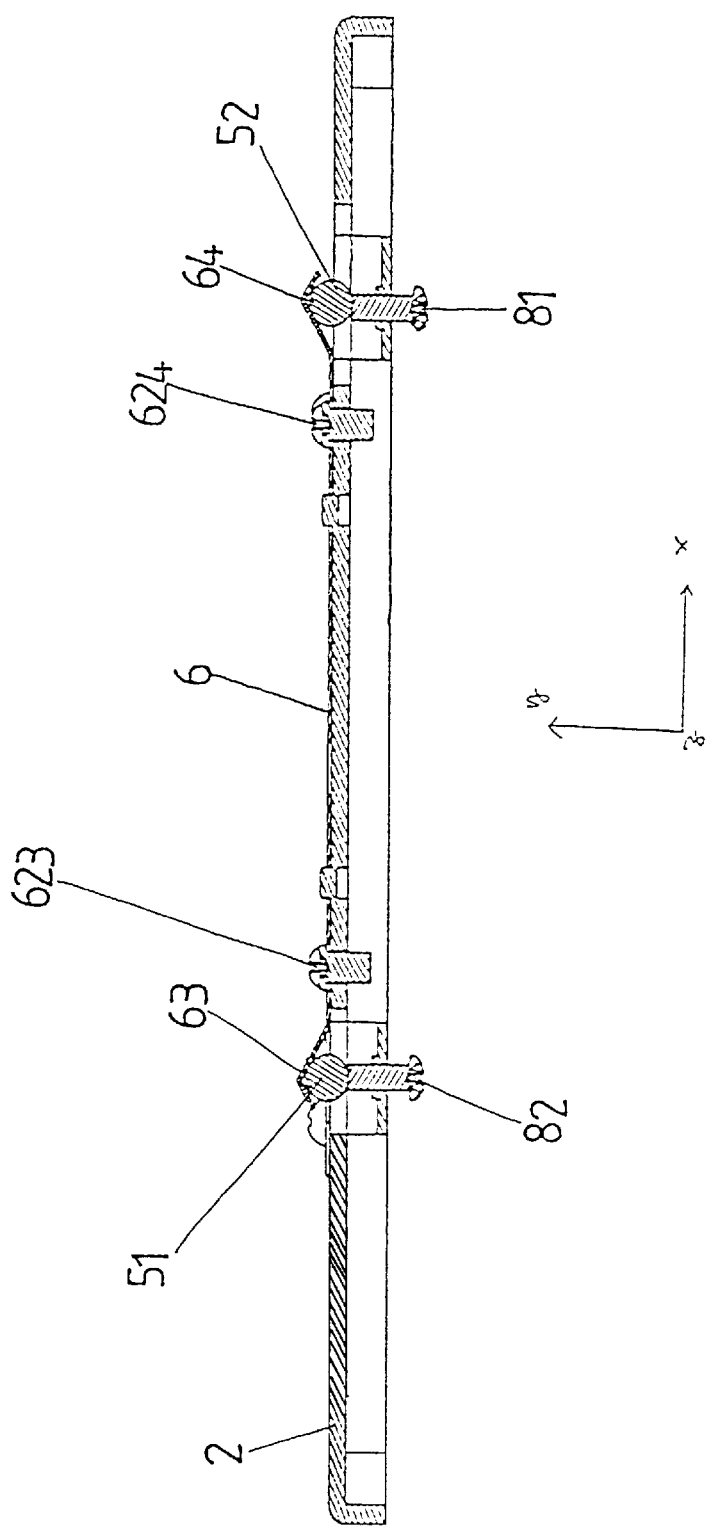
FIG. 5 is the A—A cross-sectional view of FIG. 4.

Refer to FIGS. 4 & 5, it can be easily understood that, guide rods 51, 52 is pressed by the elastic pressing plates 63, 64 and pressing plates 721, 711. Because of elastic pressing plates 63, 64 and pressing plates 721, 711 are elastic bodies, so the altitude of the guide rods 51, 52 can be adjusted by adjusting the screw 81, 82 in the y direction. When guide rods 51, 52 is vertically pushed by the screw 81, 82, because of the elastic pressing plate 63, 64 and pressing plate 721, 711, and moreover, there are support plates 21, 22, 23, 24 and 25B, 25C, 26B, 26C at the both sides to position in the x direction, so that guide rods 51, 52 can be surely positioned at the right position during move up and down.

Figure 6:
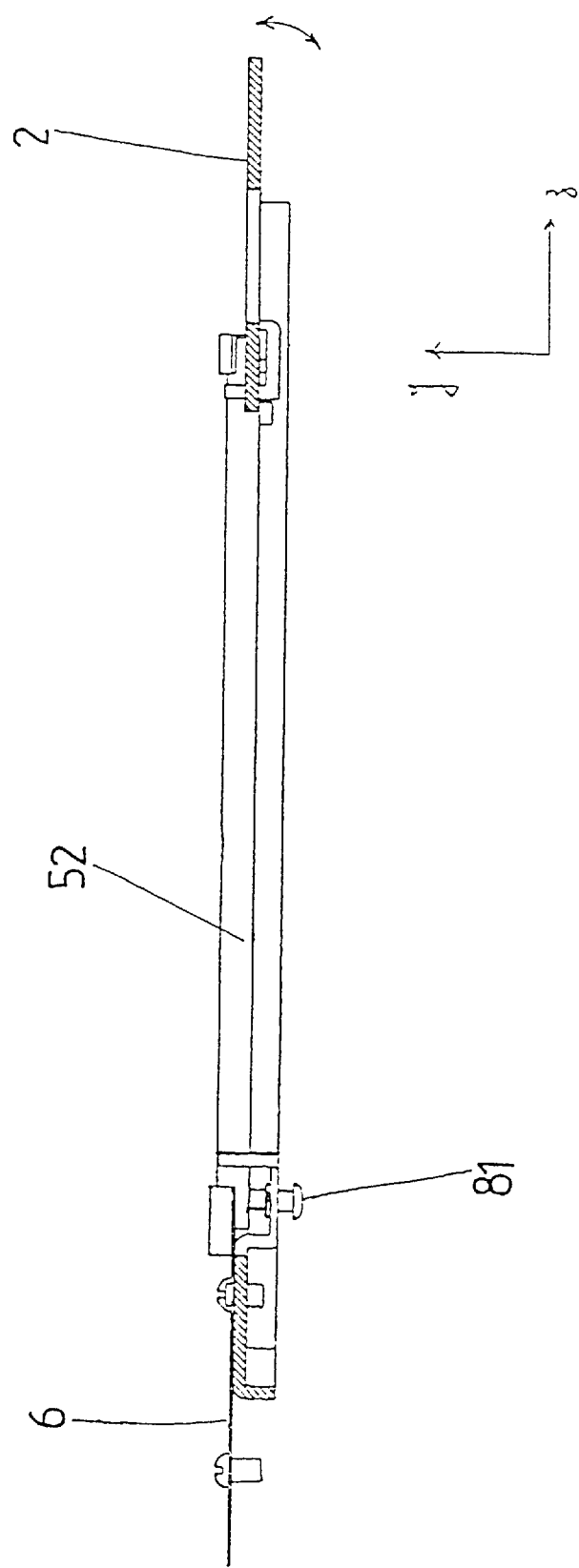
FIG. 6 is the B—B cross-sectional view of FIG. 4.

It can be seen from FIG. 6, if the substrate of the optical pick-up module 2 is assembled with the optical disk drive chassis by virtue of the fixture of the optical pick-up module and screw, because of the elasticity of the fixture of the optical pick-up module 6, the substrate of the optical pick-up module 2 at one end of the z direction can be driven by the loading mechanism of the optical disk drive to move in the y direction. (Since the loading mechanism is not the major concern in this invention, few emphasis will be put in the part.)

Figure 7:
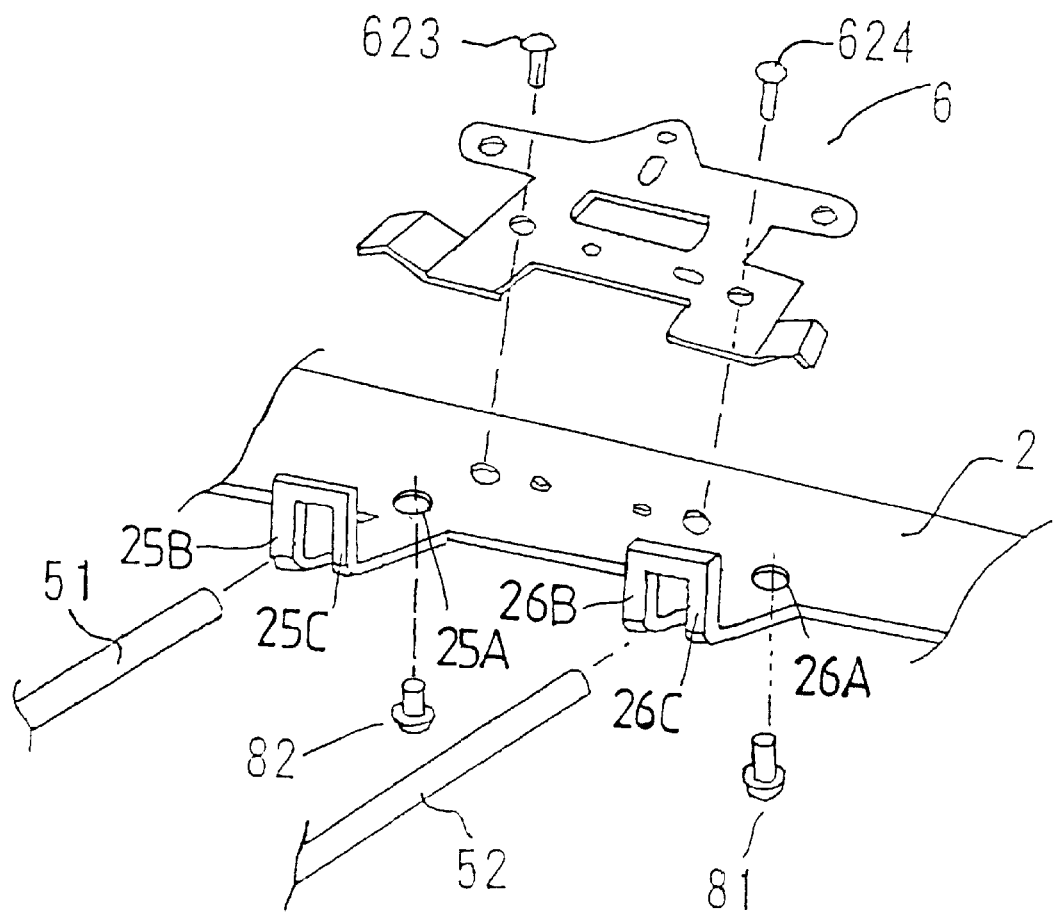
FIG. 7 is a perspective view showing the second preferred embodiment of the fixture of the guide rod of present invention.
Figure 8:
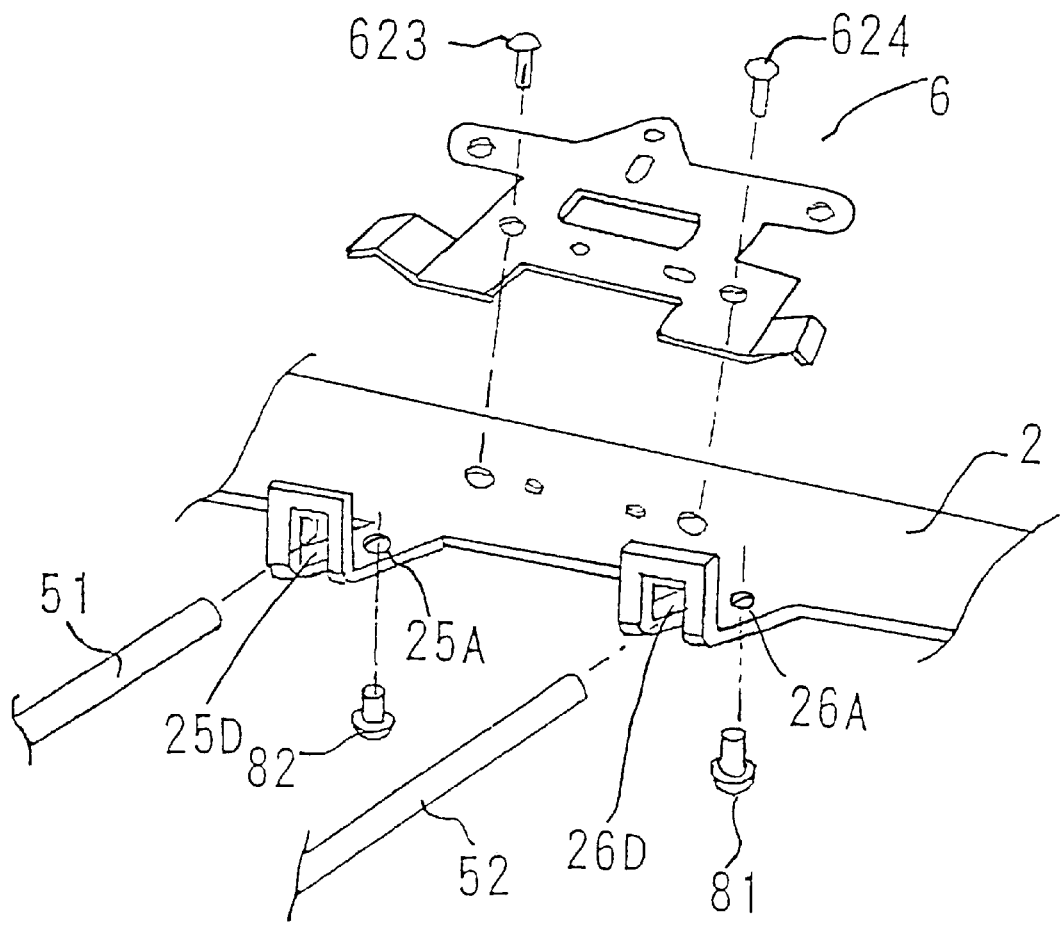
FIG. 8 is a perspective view showing the third preferred embodiment of the fixture of the guide rod of present invention.

Please refer to FIGS. 7 & 8, the fixture of the optical pick-up module 6 is fixed onto the substrate 2 by screws 623, 624, and the said fixtures of the guide rod 25, 26 also can be fixed to said substrate 2 by forming a L-shaped plate on said substrate 2, the support plates 25B, 25C, 26B, 26C of said L-shaped plate has holes for guide rods 51, 52 to put into, on the substrate 2, a plurality of screw holes 25A, 26A are formed for the adjusting screws 81, 82 to be screwed into, such that the height of guide rods 51, 52 can be adjusted.

Figure 9:
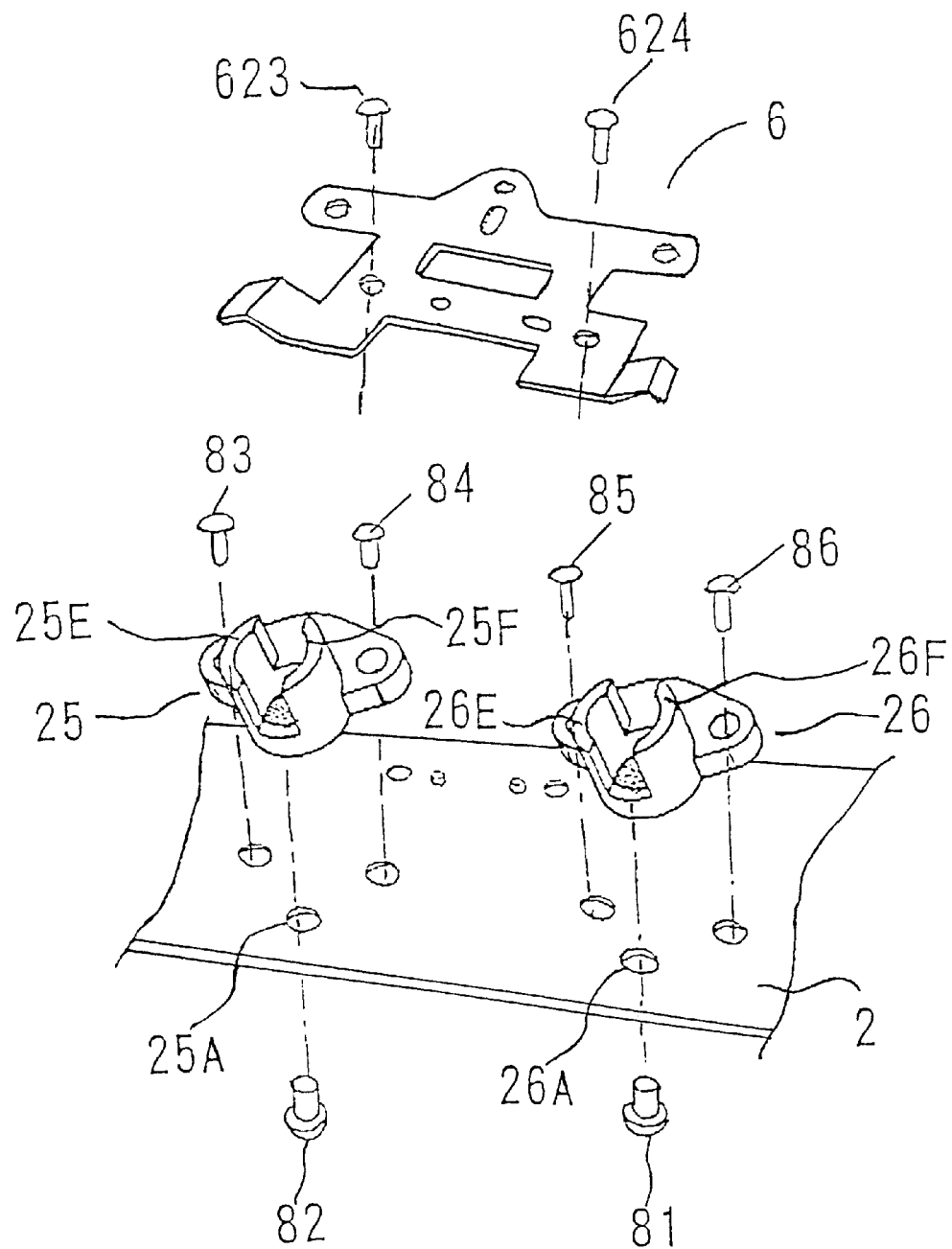
FIG. 9 is a perspective view showing the fourth preferred embodiment of the fixture of the guide rod of present invention.

Please refer to FIG. 9, the said fixtures of the guide rod 25, 26 also can be fixed onto said substrate 2 by screws 83, 84, 85, 86, said support plates 25E, 25F, 26E, 26F on the two sides of said fixtures of the guide rod 25, 26 are formed in an arc shape for the guide rod 51, 52 to penetrate through, which the center bottom of said fixtures of the guide rod 25, 26 has the holes for adjusting screws 81, 82 to be screwed into from the bottom to top, to resist against the guide rods.

Figure 10:
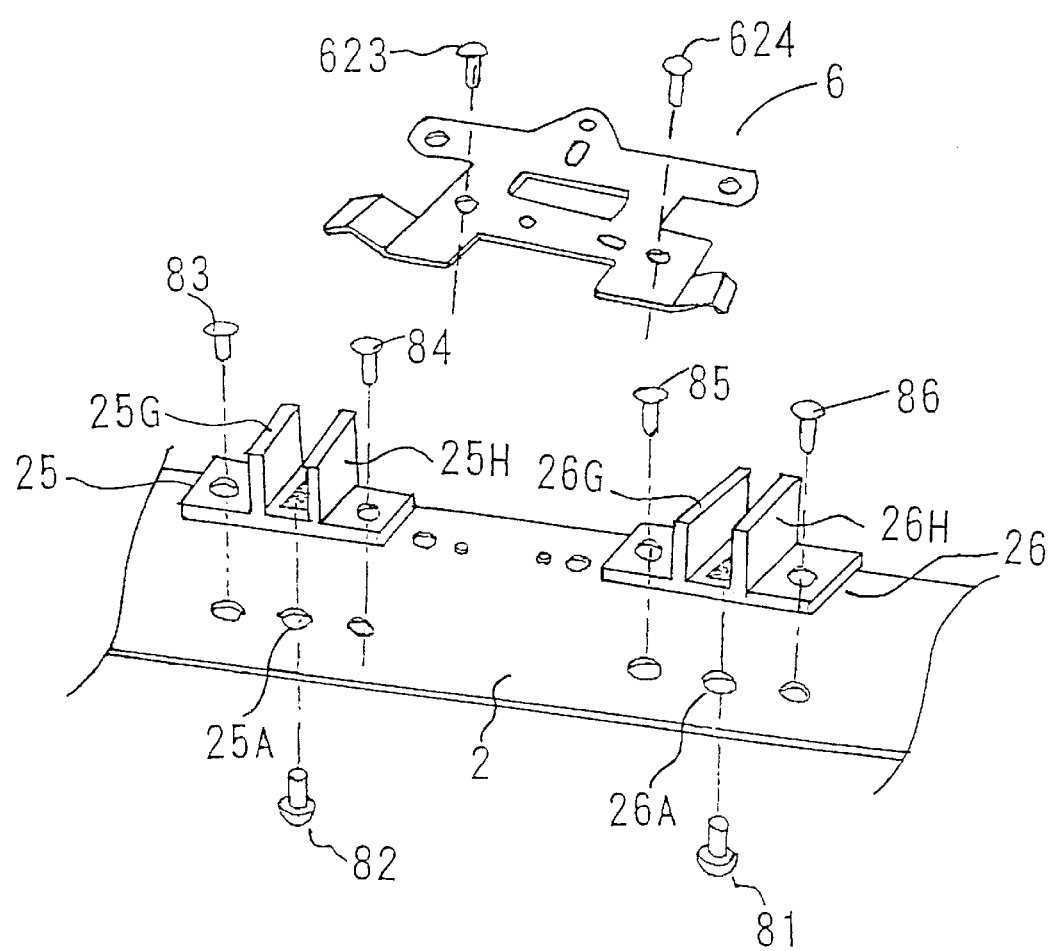
FIG. 10 is a perspective view showing the fifth preferred embodiment of the fixture of the guide rod of present invention.

Please refer to FIG. 10, the said support plates also could be parallel each other.

It should be noted that the support plates 21, 22, 23, 24 are not confined to the structure as shown in FIG. 2, the support plates 25B, 25C . . . etc as shown in FIGS. 7, 9 & 10 are also applicable.

It can be understood from the above mention, the adjusting mechanism of the guide rod of the optical pick-up according to this invention can indeed eliminate the error due to manufacture that will result into the deviation of the incident laser, and that can reduce the number of necessary parts, simplify the process of assembly, and promote the add-value of the products. These advantage can improve the drawbacks of the conventional mechanism of the guide rod of the optical pick-up. The mechanism is an innovative mechanism which has never been publicly implemented.

Although the present invention has been described with a certain degree of particularity, the present disclosure has been made by way of example and changes in details of structure may be made without departing from the spirit thereof.

What is claimed is:

1. An adjusting mechanism of a guide rod of an optical pick-up in an optical disk drive, including an optical disk drive chassis, a substrate of an optical pick-up module, the optical pick-up, guide rods for supporting the optical pickup, a fixture of the optical pick-up module, and a fixing press of the guide rod of the optical pick-up, wherein open-mode suspenders at the both sides of the optical pick-up and bearings is penetrated by the guide rods for suspension, and it is characterized in that:

the center of the substrate of the optical pick-up module disposes two support plates and fixtures of the guide rod, therefore, the two sides of the guide rod are able to span between the support plate and the fixture of the guide rod; the fixture of the guide rod dispose a plate, and the altitude of the guide rod adjusted by an adjusting screw penetrating in a screw hole in the center of the plate;

the fixing press of the guide rod of the optical pick-up is fixed by screws on the substrate, and there are pressing plates on the other end of the fixture; the pressing plates are bent to form an elbow, thereby pressing down one end of the guide rods;

the rear end of the fixture of the optical pick-up module is fixed to a platform of the optical disk drive chassis to suspend the optical pick-up module and reduce the vibration; the both sides of the front end are forming an extending elastic pressing plate respectively, and the elastic pressing plate form the elbow to press and constrain the other end of the guide rod;

the two sides of the guide rods of the optical pick-up are supported by the support plate, and the altitude is adjusted by the screw, the upper portion is pressed by the pressing plate with suitable elasticity to press and constrain the guide rods, and suspend the optical pick-up module.

2. An adjusting mechanism of the guide rod of the optical pick-up in an optical disk drive as claimed in claim 1, wherein the adjusting screw and the substrate of the optical pick-up module is fixed by dispersing glue.

3. An adjusting mechanism of the guide rod of the optical pick-up in an optical disk drive as claimed in claim 1, wherein the elbow of the pressing plate or elastic pressing plate can be in any form which suit the guide rod for pressing function.

4. An adjusting mechanism of the guide rod of the optical pick-up in an optical disk drive as claimed in claim 1, wherein said fixture of the guide rod is formed in a body with said substrate of the optical pick-up module by pressing.

5. An adjusting mechanism of the guide rod of the optical pick-up in an optical disk drive as claimed in claim 1, wherein said fixture of the guide rod is fixed to said substrate by forming a L-shaped plate on said substrate, the support plate of said L-shaped plate has holes for the guide rods to put into, on the substrate, a plurality of screw holes are formed for the adjusting screws to be screwed into, such that the height of guide rods be able to adjust.

6. An adjusting mechanism of the guide rod of the optical pick-up in an optical disk drive as claimed in claim 1, wherein said fixtures of the guide rod are fixed onto said substrate by screws, said support plates on the two sides of said fixtures of the guide are formed in an arc shape for the guide rod to penetrate through, which the center bottom of said fixture of guide has the holes for adjusting screws to be screwed into from the bottom to top, to resist against the guide rods.

7. An adjusting mechanism of the guide rod of the optical pick-up in an optical disk drive as claimed in claim 6, wherein the support plates of said fixture of the guide rod are parallel each other.

8. An adjusting mechanism of the guide rod of the optical pick-up in an optical disk drive as claimed in claim 6, wherein the material of said fixture of the guide rod is plastics or metal.

9. An adjusting mechanism of the guide rod of the optical pick-up in an optical disk drive as claimed in claim 7, wherein the material of said fixture of the guide rod is plastics or metal.

* * * * *